3,729,313
NOVEL PHOTOSENSITIVE SYSTEMS COMPRISING DIARYLIODONIUM COMPOUNDS AND THEIR USE
George H. Smith, St. Paul, Minn., assignor to Minnesota Mining and Manufacturing Company, St. Paul, Minn.
No Drawing. Filed Dec. 6, 1971, Ser. No. 205,392
Int. Cl. G03c 1/72
U.S. Cl. 96—27 R                5 Claims

ABSTRACT OF THE DISCLOSURE

A photosensitive admixture comprising a diaryliodonium compound and a compound capable of sensitizing 2-methyl-4,6-bis(trichloromethyl)-s-triazine.

---

This invention relates to new photosensitive systems and to their use in the imaging and other fields.

Certain organic compounds are known to dissociate in the presence of light and generate free radicals. Some of the more common photolyzable organic compounds generate free halogen, which is a good hydrogen abstractor and will form hydrogen halide in the presence of hydrogen donors. The generation of free radicals in photosensitive systems containing photolyzable compounds has found many practical uses, particularly in the graphic arts field. Such systems have been described for free radical photography (e.g. printout and bleach systems), free radical photopolymerization, cationic photopolymerization and photoinduced acid catalyzed reactions of many types, many of which have found valuable application in printing, duplicating copying and other imaging systems. See Light Sensitive Systems: Chemistry and Application of Nonsilver Halide Photographic Processes, J. Kosar, J. Wiley and Sons (New York, 1965) pages 158–193. Sensitizers have been employed to broaden the spectral response of photosensitive compounds, especially in the visible portion of the light spectrum.

In 1960 H. Irving and R. W. Reid reported that diaryliodonium iodide photochemically decomposes to yield iodobenzene, iodine, diphenyliodonium tri-iodide and benzene, see J. Chem. Soc., 1960, pp. 2078–2081. In this article the authors point out that other workers had produced evidence that the thermal decomposition of diphenyliodonium salts results in the formation of phenyl free radicals. However, Irving and Reid were unable to obtain any direct evidence that phenyl free radicals are produced by photodecomposition of diphenyliodonium iodide in chloroform solution with methylmethacrylate monomer, and stated that "the increased formation of iodine and especially the formation of benzene are the most striking features which distinguish the photochemical decomposition of diphenyliodonium iodide in chloroform from its thermal decomposition." Under comparable conditions they noted that the photodecomposition of the corresponding bromides, chlorides or fluorides is barely detectable. Even if phenyl free radicals were formed, the concurrent production of iodine would be detrimental, since diodine is known to react very rapidly with free radicals. In fact, evidence exists to indicate that almost every collision of iodine with an organic free radical results in a reaction [E. Horn and M. Polyanyi, Trans. Faraday Soc. 30, 189 (1934); Z. Physik Chem. B25, 151 (1934)], and iodine would be expected to scavenge any phenyl free radicals that may be produced. Moreover, it is known that iodine has a strong inhibiting effect on the polymerization of such free radical polymerization monomers as methyl methacrylate, J. Poly. Sci. Pt. A–1, vol. 4, pp. 2137;2144 (1966).

Based on such evidence it would not be expected that the photosensitive diphenyliodonium compounds would decompose with the generation of a free radical and therefore that such compounds could be used in photopolymerization and other imaging systems requiring the photogeneration of free radicals to initiate the polymerization or image forming reaction.

It has been found that diaryliodonium compounds can be sensitized with any sensitizer for known photolyzable organic halogen compounds and that the resulting sensitized system, upon exposure to light, generates free radicals which can initiate the polymerization of free radical polymerizable monomers or image forming reactions. The mechanism of photodecomposition is apparently altered in the presence of the sensitizing compounds, since the literature mentioned earlier indicates that the photodecomposition of diaryliodonium compounds does not result in the generation of free radicals. The nature of the anion associated with the diaryliodonium cation has not been found to be critical. Illustrative diaryliodonium compounds are diphenyliodonium chloride, diphenyliodonium iodide, diphenyliodonium methylphenylsulfonate, di-(heptylphenyl)iodonium bromide, diphenyliodonium - 2 - carboxylate monohydrate, di(perfluorooctylphenyl)iodonium bromide, and 2,2$^1$-dithienyliodonium chloride. The aryl radicals may also contain fused ring radicals.

Unless a sensitizer is present the diphenyliodonium compounds have not been found to produce free radicals. Fortunately any compound capable of sensitizing a photolyzable organic halogen compound, such as 2-methyl-4,6-bis(trichloromethyl)-s-triazine, will promote free radical formation when used in intimate admixture with the diphenyliodonium compound. Since each sensitizer tends to have its own characteristic response in the visible and ultraviolet light spectrum, they may be used in combination to broaden the light response and/or increase the speed. Illustrative sensitizing dyes are those in the following categories: diphenlymethane, xanthane, acridine, methine and polymethine, thiazole, thiazine, azine, aminoketone, porphyrin, colored aromatic polycyclic hydrocarbons, p-substituted aminostyryl compounds and aminotriaryl methanes. To determine whether any compound is a sensitizer for the diaryliodonium compounds, the following standard test procedure may be employed, this being definitive of those sensitizers falling within the scope of the present invention.

A standard test solution is prepared with the following composition:

5.0 parts of a 5% (weight by volume) solution in methanol of polyvinyl butyral (45,000–55,000 molecular weight, 9.0–13.0% hydroxyl content, "Butvar B76" is a trademarked product of Shawinigan Resins Co., Springfield, Mass.)
0.3 part of trimethylol propane trimethacrylate
0.03 part of 2-methyl-4,6-bis(trichloromethyl)-s-triazine (see Bull. Chem. Soc. Japan 42 pp. 2924–2930, 1969)

To this solution is added 0.01 part of the material to be tested as a sensitizer. The solution is knife coated onto a 2 mil clear polyester film using a knife orifice of 2.0 mil, and the coating is air dried for about 30 minutes. Another 2 mil clear polyester film is carefully placed over the dried but soft and tacky coating with minimum entrapment of air. The sandwich construction is then exposed for three minutes to 15,000 foot candles of incident light from a tungsten light source providing light in both the visible and ultraviolet range (General Electric 650 watt FCH quartz-iodine lamp).

Exposure is made through a stencil so as to provide exposure and unexposed areas in the construction. After exposure the cover film is removed, and the coating is treated with a finely divided colored powder, such as a color toner powder of the type conventionally used in xerography. If the tested material is a sensitizer, the trimethylol propane trimethacrylate monomer in the light exposed areas will be polymerized by the light generated free radicals from the photolyzable organic halogen compound, i.e., 2-methyl-4,6-bis(trichloromethyl)-s-triazine. Since the polymerized areas are essentially tack free, the colored powder will selectively adhere only to the tacky, unexposed areas of the coating, providing a visual image corresponding to that in the stencil.

Although the concentration ratio of sensitizer to photosensitive compound is not critical and will depend on such factors as the desired use, the selection of sensitizer, the selection of diaryliodonium compound, etc., generally the molar concentration ratio is between 1/100 and 2/1, respectively, preferably 1/20 to 1/1. Coatings, layers, films or sheets made from solutions or dispersions of these ingredients, with or without a suitable binder, are quite stable in the absence of light and can be stored for extended periods under ordinary room conditions.

Because the compositions of this invention generate free radicals under exposure to light, they are particularly valuable in imaging systems containing free radical polymerizable monomers, i.e., photopolymerization systems. The free radical polymerizable monomer is normally contained in or in contact with the free radical generating components. After polymerization has taken place in the light struck areas of a sheet or web coated with the light sensitive system and monomer, the unpolymerized monomer may be removed or transferred to a receptor sheet, where it can be developed into a visible image. Additionally, the original sheet containing a polymerized image may be used to form the desired image. When there is a marked difference in wetting characteristics between the polymer and the monomer (or between the polymer and the sheet backing if the monomer is removed or transferred), the construction may be used as a lithographic master. If the light sensitive composition is filled or colored with a dye or pigment, the physical removal of monomer from the unexposed areas of the sheet surface can immediately produce a visible image, i.e. a negative image on the original sheet and a positive image on the transfer sheet carrying the removed unpolymerized monomer. Subsequent light exposure of the transfer sheet (or receptor sheet, if the monomer "image" is transferred to a receptor sheet) will then provide a permanent image thereon. When the unpolymerized monomer is transferred to a receptor sheet, a reactive color forming component may be included in the original light sensitive coating and may, after light exposure, be transferred along with unexposed monomer to a receptor containing a co-reactant which reacts with the color forming component to develop a color image. The image thus can be developed in the receptor sheet without the need for applying a developer powder or toner material.

The free radicals generated in accordance with this invention can also be used in many other types of imaging systems which do not involve polymerization. For example, the light sensitive system may include a reactive component which is capable of color formation or change in the presence of free radicals. In one such system, as described in U.S. Pat. No. 3,598,592, free radicals are generated by light exposure of organic photolyzable compounds or photooxidants and react with amino triarylmethane to develop a visible color image. Any system in which light is used to generate free radicals can employ the sensitized diaryliodonium system of the present invention as a source of free radicals, and such system need not be limited to the imaging field.

Free radical polymerizable monomers are well known, as illustrated in the Kosar text cited above. Ethylenically unsaturated compounds are known to be of particular value as useful monomers in photopolymerization systems.

In the following illustrative examples all percentages are reported as weight by volume, i.e. weight in grams ×100 per volume in milliliters.

EXAMPLES 1–12

A stock solution was prepared as follows:

100 parts of pentaerythritol tetraacrylate
167 parts of a 20% dispersion of finely divided nickel stearate in methyl ethyl ketone
3.34 parts of diphenyliodonium bis (trifluoromethylsulfonyl) methide In separate examples, .02 part of the various sensitizing dyes listed in Table I were added to 5 part portions of the above stock solutions and well mixed. Each portion was then knife coated under safelight conditions onto a 2.0 mil polyester film using a knife coater set at 3.0 mil. After drying to remove solvent, a second 2.0 mil polyester film was laminated to the dried coating using a hand roller and taking care not to entrain air. Samples were exposed through a stencil to tungsten light of 15,000 foot candles of incident energy. They were then peeled apart and the top film was laid against a piece of receptor paper and hand pressure applied through a roller or rubber straight edge to transfer unexposed coating to the receptor paper. The receptor paper was a bond weight paper knife coated at 4.0 mil wet with 20 parts of a 5% solution of ethyl cellulose in acetone containing 0.1 part of dibenzyl dithiooxamide. After transfer, the paper was heated for 5 to 10 sec. at about 100° C. to cause the transferred nickel stearate to react with the dibenzyl dithiooxamide to form a dark purple color. A positive copy of the original of high contrast was obtained. The table shows the time of exposures used. Reflex exposures can also be used.

TABLE I

| Ex. | Dye | Exp, time, sec. |
|---|---|---|
| 1 | Rhodamine 6 G (C.I. No. 45160) | 29 |
| 2 | Acridine Orange (C.I. No. 46055) | 10 |
| 3 | Perylene | 9 |
| 4 | $\phi_2 N\phi CH=CHCO\phi OCH_3$ | 2.5 |
| 5 | 2-ethyl-9,10-dimethoxyanthracene | 14 |
| 6 | Thioflavin T (C.I, No, 49005) | 6 |
| 7 | Setoflavin T (C.I, No, 49005) | 5 |
| 8 | Methylene Blue (C.I, No. 52015) | 6 |
| 9 | Neutral Red (C.I. No. 50040) | 21 |
| 10 | Auramine SP (C.I. No. 41000) | 29 |
| 11 | 1-methyl-3-allyl-5[3-ethyl-2-benzoxazolinylidene)ethylidene]-2-thiohydantoin, | 3.5 |
| 12 | [structure diagram] | 1 |

EXAMPLES 13–18

The following examples illustrate the use of various iodonium salts.

A stock solution was prepared as follows:

100 parts of pentaerythritol tetraacrylate
167 parts of a 20% dispersion of finely ground nickel stearate in methyl ethyl ketone
1.2 parts of 1 - (p-methoxyphenyl)-3-(p-diphenylaminophenyl)-2-propen-1-one In separate examples .08 part of the various iodonium salts listed in Table II were added to 5 part portions of the above stock solution. Coating sandwiches were prepared and copies of an original were made in the same manner as in Examples 1–12.

TABLE II

| Example | Iodonium salt | Exp. time, seconds |
|---|---|---|
| 13 | $\phi_2$I+Cl- | 14 |
| 14 | $\phi_2$I+I- | 50 |
| 15 | $\phi_2$I+CH$_3\phi$SO$_3$- | 6 |
| 16 | (C$_7$H$_{15}\phi$)$_2$I+Br- | 21 |
| 17 | (C$_8$F$_{17}$SO$_3\phi$)$_2$I+Br- | 40 |
| 18 | 2,2'-dithienyliodonium chloride | 30 |

EXAMPLES 19–35

The following stock solution was prepared:

200 parts of 5% polyvinylbutyral in methanol
6.0 parts of trimethylol trimethacrylate
1.2 parts of diphenyliodonium chloride In separate examples .01 part of the various sensitizing dyes listed in Table III were added to 5 part portions of the above stock solution. Each portion was then knife coated on 2.0 mil polyester film using a knife coater set at 2.0 mils. After drying to remove solvent, a second 2.0 mil polyester film was laminated to the dried coating, taking care not to entrain air. Samples were exposed through a stencil to tungsten light of 15,000 foot candles of incident energy. They were then peeled apart and the bottom film was developed by dusting with a resin coated colored toner powder. At the exposure times listed in the table, the toner powder adhered to the unexposed areas only to give positive copies of the original in any color desired.

TABLE III

| Example | Sensitizer | Exp. time, seconds |
|---|---|---|
| 19 | No dye | (1) |
| 20 | 2-p-dimethylaminostyryl quinoline | 0.5 |
| 21 | 2-p-dimethylaminostyryl-3-methyl benzothiazolium toluenesulfonate | 1.5 |
| 22 | p-Dimethylaminostyryl phenyl ketone | 0.5 |
| 23 | 7-dimethylamino-4-methyl coumarin | 21 |
| 24 | Hematoporphyrin hydrochloride | 1.5 |
| 25 | Setoflavin T (C.I. No. 49005) | 14 |
| 26 | Phenosafranine (C.I. No. 50200) | 40 |
| 27 | Acridine Red (C.I. No. 45000) | 40 |
| 28 | Acridine Orange (C.I. No. 46055) | 0.5 |
| 29 | Auramine SP (C.I. No. 41000) | 6 |
| 30 | Azure A (C.I. No. 52005) | 5 |
| 31 | 3,3'-diethyl oxacarbocyanine iodide | 1 |
| 32 | 3,3'-diethyl-2,2'-oxaselanocarbocyanide iodide | 1 |
| 33 | [2-(3-B-hydroxyethyl-thiazolidine)]-(5'-[3'-ethyl-2'-thiothiazolid-4-one)]-dimethin merocyanine. | 1 |
| 34 | [2-(1,5,5-trimethylpyrrolidine)]-[5'-(3'-carboxymethyl-2'-thiothiazolid-4'-one)]dimethin merocyanine. | 1 |
| 35 | 4,4',4''-methylidynetris(N,N-dimethylaniline) | 120 |

[1] No reaction after 240.

All of the sensitizers in Examples 20–34 are colored dyes and thus sensitize in the visible light region. Example 35 is colorless but is sensitive to ultraviolet light. The formulation of Example 35 would therefore be more efficient if a light source with a high ultraviolet component were used.

EXAMPLE 36

A solution of the following materials was prepared and knife coated on a suitable substrate at 2.0 mil wet.

15 ml. of 15% aqueous gelatin
3 ml. of a monomer solution composed of 18.0 g. acrylamide, 0.7 g. methylene bis acrylamide, and 12 ml. water
.08 g. diphenyliodonium chloride
.04 g. bis-2(3-ethyl benzothiazole)-2'-methyl trimethincyanine bromide The dried coated sample was exposed through a stencil to tungsten light of 1000 foot candles of incident energy for eight seconds. The exposed sample was washed with water causing removal of the unexposed area. A red positive copy of the original was obtained.

EXAMPLES 37–47

The following stock solution is prepared:

100 parts 5% cellulose acetate butyrate in methyl ethyl ketone
12 parts trimethylolpropane trimethacrylate
0.5 part diphenyliodonium paratoluene sulfonate To 5 parts of the above solution is added 0.006 part of the dyes listed in Table IV. The solutions are then knife coated at a wet thickness of 2.0 mil on a 3.0 mil polyester film. When the coatings are air dried ½ hour, a cover sheet of 2.0 mil polyester is laminated to them. A sample of each of the coatings is then exposed through a calibrated Eastman Kodak Photographic Step Tablet #3 using a tungsten light source of 15,000 foot candles of incident energy. The cover sheet is then removed and the exposed coating is treated with a colored toner powder which adheres to unpolymerized areas only. Table IV shows the light intensity required to produce sufficient polymerization to prevent adherence of the toner powder.

TABLE IV

| Example | Dye | Light intensity, f.c.s. |
|---|---|---|
| 37 | Setoflavin T (C.I. No. 49005) | 60,000 |
| 38 | p-Dimethylaminostyryl benzothiazole | 600,000 |
| 39 | 5-10-diethoxyviolanthrene | 368,000 |
| 40 | 5-10-diethoxy-12,16,17-trichloroviolanthrene | 350,000 |
| 41 | 5,10-diethoxy-16,17-dimethoxyviolanthrene | 120,000 |
| 42 | 5,10-diethoxy-3,4,8.9-dibenzopyrene | 120,000 |
| 43 | 9,18-diethoxy-6,15-dichlo4oisoviolanthrene | 350,000 |
| 44 | Hematoporphyrin | 600,000 |
| 45 | Protoporphryin | 600,000 |
| 46 | Protoporphyrin dimethyl ester | 240,000 |
| 47 | Phylloporphyrin | 600,000 |

EXAMPLES 48–53

The following stock solution is prepared:

30 parts 15% hydrolyzed copolymer of maleic anhydride and methyl vinyl ether ("Gantrez HY-H," a trademarked product of GAF Co., New York, N.Y.) in methanol
3.6 parts acrylamide
0.14 part methylene bis acrylamide
0.16 part diphenyliodonium chloride To 5 parts of the above solution is added .006 parts of the dyes listed in Table V. The solutions are then knife coated at a wet thickness of 3.0 mil on a gelatin subbed 5.0 mil polyester film. A dried sample of each of the coatings is then exposed through a calibrated step tablet using a tungsten light of 15,000 foot candles of incident energy. After exposure, the sample is then washed with water or methanol to dissolve away the unexposed areas leaving the polymerized exposed areas. Table V lists the light intensity required to cause insolubility.

TABLE V

| Example | Dye | C.I. No. | Light intensity, f.c.s. |
|---|---|---|---|
| 48 | Genacryl Pink G | (48015) | 180,000 |
| 49 | Genacryl Pink 6B | (48020) | 120,000 |
| 50 | Vasoflavin | (49010) | 42,000 |
| 51 | Benzoflavin | (46065) | 60,000 |
| 52 | Erythrosine B | (45430) | 180,000 |
| 53 | Brill. Sulfoflavin FFA | (56205) | 18,000 |

EXAMPLES 54–56

The following solution is prepared:

3 parts acrylamide
1 part methylenebisacrylamide
0.1 part diphenyliodonium chloride
25 parts water To 2 ml. of the above solution in a test tube is added 1 drop of a 1% solution of the dye in methanol. The solution was then purged with nitrogen for two minutes and exposed to tungsten light of 10,000 foot candles of incident energy. The following table lists the dye and the time in seconds of exposure to cause polymer to precipitate.

| Example | Dye | Time, seconds |
|---|---|---|
| 54 | Eosin Yellow (C.I. No. 45380) | 30 |
| 55 | Phloxine B (C.I. No. 45410) | 30 |
| 56 | Setoflavin T (C.I. No. 49005) | 30 |

A sample containing no dye showed no polymer formation after 120 seconds of exposure.

EXAMPLE 57

Into 5 grams of a 5% methanol solution of cellulose butyrate was dissolved in 0.03 gram of 4,4',4''-methylidynetris (N,N-dimethylaniline) and 0.15 gram of diphenyliodonium chloride. The solution was coated onto a polyester film at 4.0 mil wet thickness. After the sample had dried it was exposed for 30 seconds to a 500 watt ultraviolet lamp (GE–H3T7) at a distance of 7 inches. A dense blue image resulted. When the diphenyliodonium chloride was omitted, no visible image was observed after a similar light exposure. This sample illustrates the use of a diaryliodonium compound in an imaging system having a sensitizer which becomes colored in the presence of free radicals.

What is claimed is:

1. A photosensitive admixture comprising a diaryliodonium compound and a compound capable of sensitizing 2-methyl-4,6-bis(trichloromethyl)-s-triazine.
2. The photosensitive admixture of claim 1 in which said admixture contains a film-forming binder.
3. The photosensitive admixture of claim 1 in which said admixture contains a colorant.
4. A sheet construction containing the photosensitive admixture of claim 1.
5. A process which comprises exposing to visible light the photosensitive admixture of claim 1.

References Cited

Irving, H., et al.: J. Chem. Soc., 1960, pp. 2078–81.
Chemical Abstacts, vol. 53, 16775 c.

RONALD H. SMITH, Primary Examiner

U.S. Cl. X.R.

96—48 R, 88, 90 R, 115 P; 204—159.23

UNITED STATES PATENT OFFICE
CERTIFICATE OF CORRECTION

Patent No. 3,729,313    Dated April 24, 1973

Inventor(s) GEORGE H. SMITH

It is certified that error appears in the above-identified patent and that said Letters Patent are hereby corrected as shown below:

Column 1, line 60, "diodine" should read -- iodine --.

Column 1, line 63, "Polyanyi" should read -- Polanyi --.

Column 2, line 37, "xanthane" should read -- xanthene --.

Column 2, line 70, "exposure" should read -- exposed --.

Column 4, Table I, Example 11, "1-methyl-3-allyl-5[3-ethyl-2-benzoxazolinyldene)ethylidene]-2-thiohydantoin," should read -- 1-methyl-3-allyl-5[(3-ethyl-2-benzoxazolinyldene)ethylidene]-2-thiohydantoin --.

Column 5, Table III, Example 33, "[2-(3-B-hydroxyethyl-thiazolidine)]-(5'-[3'-ethyl-2'-thiothiazolid-4-one)]-dimethin merocyanine" should read -- [2-(3-B-hydroxyethyl-thiazolidine)]-[5'-(3'-ethyl-2'-thiothiazolid-4-one)]-dimethin merocyanine --.

Column 6, Table IV, Example 39, "5-10-diethoxyviolanthrene" should read -- 5,10-diethoxyviolanthrene --.

Column 6, Table IV, Example 40, "5-10-diethoxy-12,16,17-trichloroviolanthrene" should read -- 5,10-diethoxy-12,16,17-trichloroviolanthrene --.

Column 6, Table IV, Example 43, "9,18-diethoxy-6,15-dichlo4oisoviolanthrene" should read -- 9,18-diethoxy-6,15-dichloroisoviolanthrene --.

Column 6, Table IV, Example 45, "Protoporphryin" should read -- protoporphyrin --.

Signed and sealed this 20th day of November 1973.

(SEAL)
Attest:

EDWARD M. FLETCHER, JR.
Attesting Officer

RENE D. TEGTMEYER
Acting Commissioner of Patent